US009100421B2

(12) United States Patent　　(10) Patent No.: US 9,100,421 B2
Greenlee et al.　　(45) Date of Patent: Aug. 4, 2015

(54) ENTERPRISE APPLICATION SESSION CONTROL AND MONITORING IN A LARGE DISTRIBUTED ENVIRONMENT

(71) Applicant: International Business Machines Corporation, Armonk, NY (US)

(72) Inventors: Gordan G. Greenlee, Endicott, NY (US); Richard J. McCarty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 13/674,702

(22) Filed: Nov. 12, 2012

(65) Prior Publication Data

US 2014/0136681 A1　　May 15, 2014

(51) Int. Cl.
G06F 15/173　　(2006.01)
H04L 29/08　　(2006.01)

(52) U.S. Cl.
CPC .............. *H04L 67/14* (2013.01); *H04L 67/125* (2013.01)

(58) Field of Classification Search
CPC .............................. H04L 67/14; H04L 67/125
USPC .......................................................... 709/224
See application file for complete search history.

(56) References Cited

U.S. PATENT DOCUMENTS

| 5,101,402 A | 3/1992 | Chiu et al. |
|---|---|---|
| 6,158,010 A | 12/2000 | Moriconi et al. |
| 6,182,142 B1 | 1/2001 | Win et al. |
| 6,195,432 B1 | 2/2001 | Takahashi et al. |
| 6,510,466 B1 | 1/2003 | Cox et al. |
| 1,129,182 A1 | 9/2006 | Loy et al. |
| 7,356,697 B2 | 4/2008 | Barnabo et al. |
| 7,529,823 B2 | 5/2009 | Trufinescu et al. |
| 7,877,792 B2 | 1/2011 | Barnabo et al. |
| 8,799,416 B2 | 8/2014 | Kim et al. |
| 2002/0095591 A1 | 7/2002 | Daniell et al. |
| 2004/0205473 A1* | 10/2004 | Fisher et al. ................... 715/500 |
| 2006/0031442 A1* | 2/2006 | Ashley et al. ................. 709/223 |
| 2009/0113050 A1* | 4/2009 | Hatanaka ...................... 709/224 |

(Continued)

OTHER PUBLICATIONS

U.S. Appl. No. 13/674,672.

*Primary Examiner* — Thomas Lee
*Assistant Examiner* — Volvick Derose
(74) *Attorney, Agent, or Firm* — Francis Lammes; Stephen J. Walder, Jr.; Jeffrey S. LaBaw

(57) ABSTRACT

Mechanisms are provided for performing centralized monitoring of application sessions across a distributed computing environment comprising a plurality of application servers. A request to perform an application session monitoring operation to monitor at least one of input or output streams of application sessions associated with a specified user account identifier is received. A plurality of application instances upon which to perform the requested application session monitoring operation are identified. An application session monitoring request is transmitted to a plurality of session control clients associated with the application instances on a plurality of application servers of the distributed computing environment. The application session monitoring request causes each session control client to monitor at least one of an input or an output stream of application sessions of application instances that are associated with the specified user account identifier, and report results of the monitoring back to the data processing system.

27 Claims, 8 Drawing Sheets

(56) References Cited

U.S. PATENT DOCUMENTS

| | | | |
|---|---|---|---|
| 2010/0268991 A1* | 10/2010 | Birch et al. | 714/32 |
| 2010/0333167 A1* | 12/2010 | Luo et al. | 726/1 |
| 2011/0029665 A1* | 2/2011 | Wenig et al. | 709/224 |
| 2012/0005334 A1* | 1/2012 | Raja et al. | 709/224 |
| 2012/0117615 A1* | 5/2012 | MacKinnon et al. | 726/1 |
| 2012/0284712 A1* | 11/2012 | Nimmagadda et al. | 718/1 |
| 2012/0317633 A1* | 12/2012 | O'Donnell et al. | 726/10 |
| 2012/0324530 A1 | 12/2012 | Hitomi et al. | |
| 2012/0331570 A1 | 12/2012 | Hitomi et al. | |

* cited by examiner

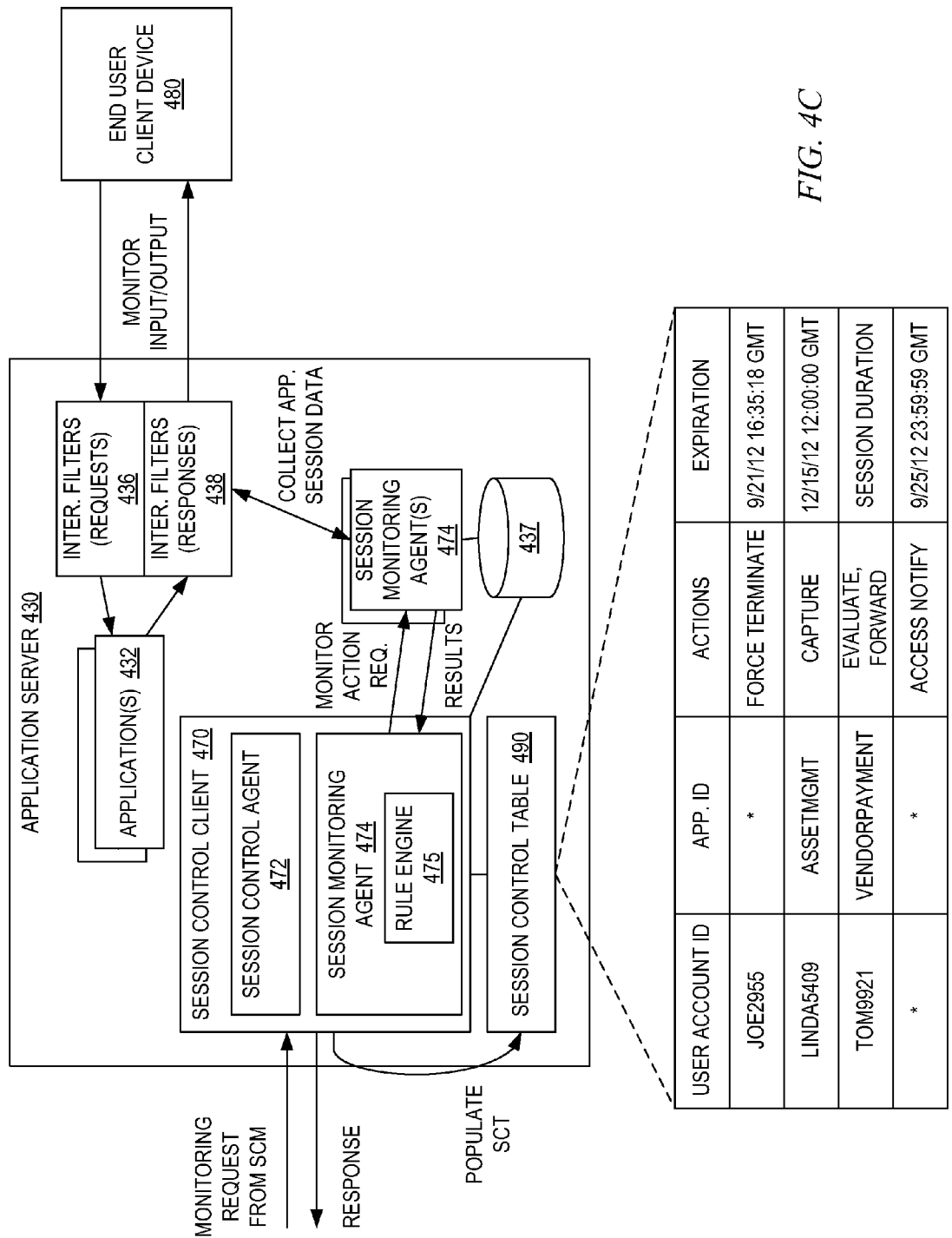

US 9,100,421 B2

ENTERPRISE APPLICATION SESSION CONTROL AND MONITORING IN A LARGE DISTRIBUTED ENVIRONMENT

BACKGROUND

The present application relates generally to an improved data processing apparatus and method and more specifically to mechanisms for performing enterprise application session control and monitoring in a large distributed environment.

Situations in which it is necessary to monitor or terminate user access to applications and other computing resources are not unusual. One such scenario is employee termination. In the majority of cases, it is sufficient to de-provision the user, i.e. perform account revocation or entitlement removal so that the user can no longer access the computing resources and applications. However, circumstances do arise in which de-provisioning alone is not sufficient. These often involve more sensitive employee terminations or similar scenarios in which a user may have existing active application sessions which will not be affected by de-provisioning, e.g., directory lookup operations and entitlement checks may have already taken place.

When a potential risk exists with a specific user's access to enterprise applications and services, account revocation or entitlement removal to prevent future access may be insufficient. This is because the user may have active application sessions which remain unaffected by such de-provisioning operations.

To add to the difficulty in handling such situations, most modern large scale enterprises utilize distributed computing environments with no central control over application sessions. That is, a distributed enterprise computing environment typically includes a plurality of application servers and/or computing devices that independently manage their own application sessions. Thus, the de-provisioning of a user's account in one portion of the distributed enterprise computing environment, e.g., with regard to one application server, may not be propagated to other portions of the distributed enterprise computing environment at all, or at least in sufficiently efficient manner to avoid security issues.

SUMMARY

In one illustrative embodiment, a method, in a data processing system, is provided for performing centralized monitoring of application sessions across a distributed computing environment comprising a plurality of application servers. The method comprises receiving a request to perform an application session monitoring operation to monitor at least one of input or output streams of application sessions associated with a specified user account identifier. The method further comprises identifying a plurality of application instances upon which to perform the requested application session monitoring operation. Moreover, the method comprises transmitting an application session monitoring request to a plurality of session control clients associated with the application instances, on a plurality of application servers of the distributed computing environment. The application session monitoring request causes each session control client, in the plurality of session control clients, to monitor at least one of an input or an output stream of application sessions of application instances, associated with the session control client, that are associated with the specified user account identifier, and report results of the monitoring back to the data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A-4C are example diagrams illustrating a centralized application session control and monitoring operation in accordance with one illustrative embodiment;

DETAILED DESCRIPTION

Figure 1:
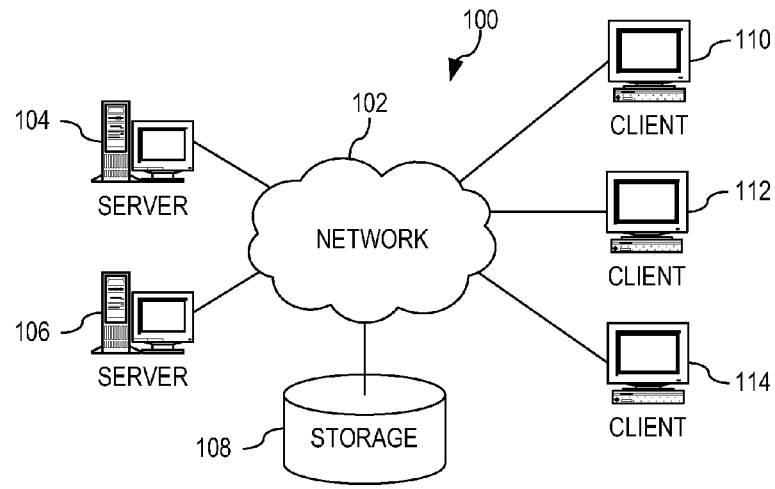
FIG. 1 is an example diagram of a distributed data processing system in which aspects of the illustrative embodiments may be implemented.

The illustrative embodiments provide mechanisms for performing enterprise application session control and monitoring in a large distributed environment. The illustrative embodiments provide a centralized capability for monitoring and controlling user sessions across a distributed enterprise computing environment. The illustrative embodiments comprise a central management service and a distributed endpoint client deployed on each managed application server. The management service and client endpoints communicate via one or more data networks and corresponding network protocols. Management actions may be initiated either from the central service, or by an alert generated within the infrastructure, e.g., in response to the detection of a suspicious action in the enterprise computing environment. The central management service provides an enterprise-level capability for terminating user application sessions, monitoring end-user application requests and/or responses in realtime, and performing dynamic modification of end-user application requests and/or responses.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
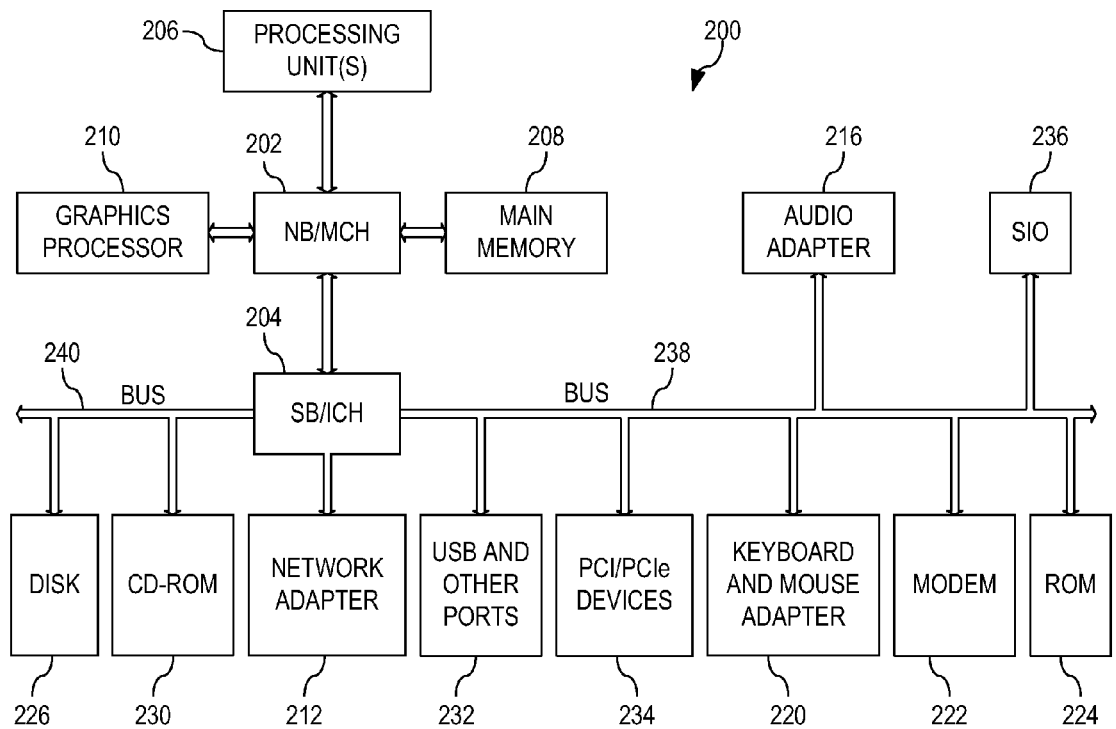
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented.

Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system

200 may be any known or later developed data processing system without architectural limitation.

With reference again to FIG. 1, one or more of the server computing devices, e.g., server 104 and/or 106, may be configured to operate as an centralized enterprise session control system which implements an enterprise session services mechanism in accordance with the illustrative embodiments described herein. One or more other servers 104 and/or 106, or other server computing devices not shown in FIG. 1, may be application servers configured with a session control client of the illustrative embodiments. The enterprise session services of the centralized enterprise session control system may unicast and/or multicast to the session control clients of the application servers to facilitate the termination of user application sessions, monitoring of end-user application requests and/or responses in real time, and performing dynamic modification of end-user application requests and/or responses, as described in greater detail hereafter. Moreover, the enterprise session services may receive responses back and other data from the session control clients of the application servers. In this way, the enterprise session services of the centralized enterprise session control system works in concert with the session control clients of the separate application servers across the distributed enterprise computing environment to achieve centralized control of application sessions.

Figure 3:
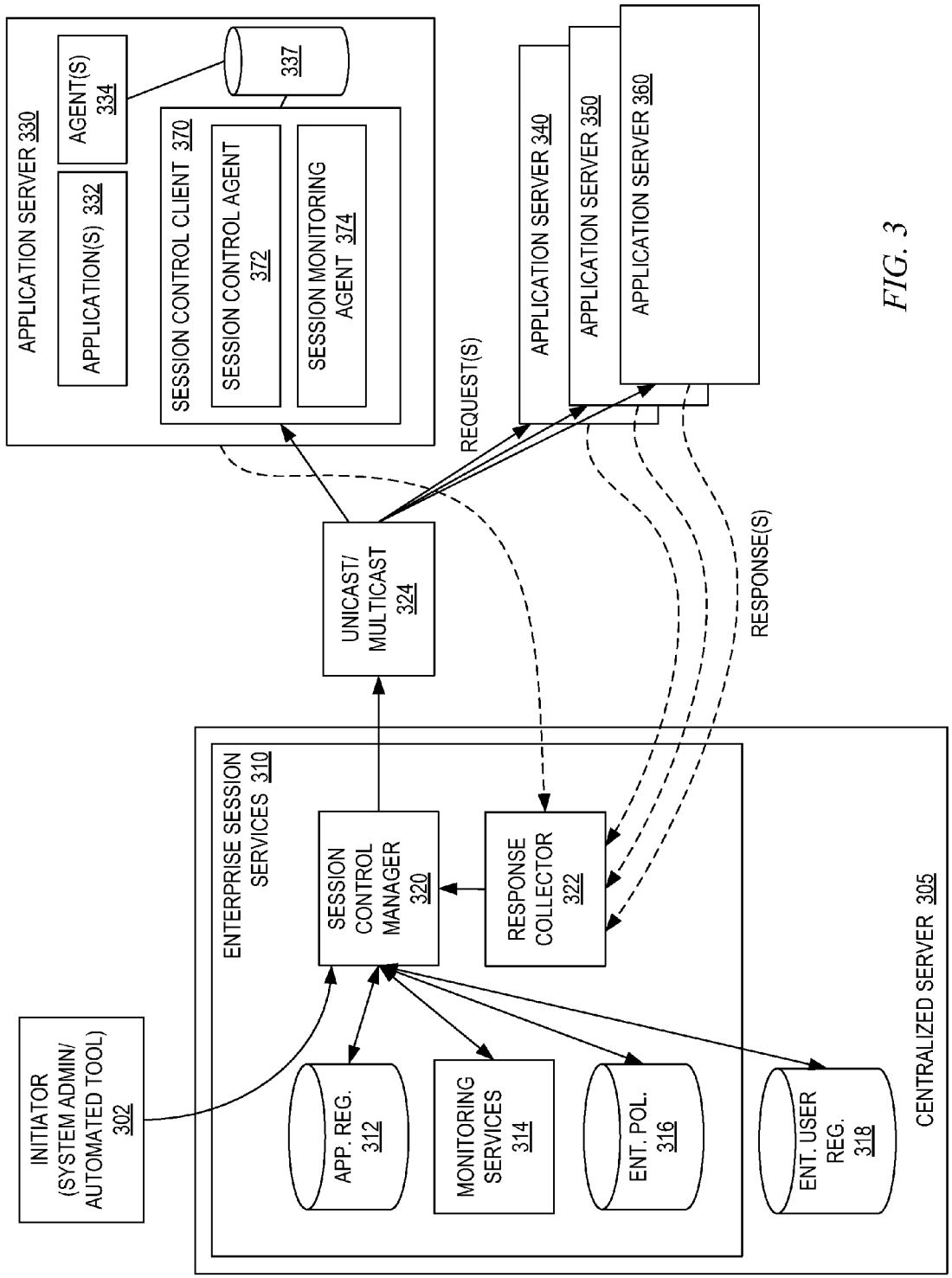
FIG. 3 is an example block diagram of centralized enterprise session control system architecture in accordance with one illustrative embodiment.

FIG. 3 is an example block diagram of centralized enterprise session control system architecture in accordance with one illustrative embodiment. The elements shown in FIG. 3 may be implemented in software, hardware, or any combination of hardware and software. In one illustrative embodiment, the elements shown in FIG. 3 are implemented as software instructions loaded into one or more memories associated with one or more processors of one or more data processing systems. The software instructions, when executed by corresponding ones of the one or more processors, cause the processors to implement the elements and functionality attributed to these elements shown in FIG. 3. In other illustrative embodiments, one or more of the elements shown in FIG. 3 may be implemented in hardware logic, such as Application Specific Integrated Circuits (ASICs), or the like.

As shown in FIG. 3, the primary components of a centralized enterprise session control system architecture comprise an enterprise session services component 310 of a centralized enterprise session control server 305 and session control clients (SCCs) 370 of application servers 330-360 in the distributed enterprise computing environment. The enterprise session services (ESS) 310 provides a focal point for session control and monitoring across all of the application servers 330-360 equipped with a SCC 370. Applications 332 of the various application servers 330-360 interact with the ESS 310 via the SCCs 370.

The SCCs 370 may be implemented, for example, within the context of a Java programming language Java Platform Enterprise Edition (J2EE/JEE) application server, such as WebSphere Application Server, JBoss, or other J2EE/JEE application server implementation. Of course, this is just an example and the SCC 370 may be implemented in other types of application environments without departing from the spirit and scope of the illustrative embodiments. Moreover, the SCC 370 implementations are not limited to Web application scenarios. Some or all aspects of the functionally described herein may be implemented in any computing environment by implementing components of the illustrative embodiments in forms specific to the particular computing environment. For example, a non-Web implementation of the illustrative embodiments may be directed to terminating active login sessions to *nix systems or instant messaging systems. For purposes of the following description, however, the illustrative embodiments will be described in the context of a J2EE/JEE application server.

The ESS 310 comprises a runtime component, referred to as the session control manager (SCM) 320, that is responsible for the overall coordination of session control and monitoring activities under the direction of an administrative user 302 or automated administrative system (not shown). The ESS 310 is further associated with an application registry storage 312, monitoring services 314, an enterprise policies storage 316, and an enterprise user registry 318. The application registry contains the metadata associated with the applications, application instances, or other components of the application servers 330-360 known to the ESS 310. The monitoring services 314 implements centralized functions associated with application monitoring, processing input data provided by applications 332, and the like, on the application servers 330-360. The enterprise policies storage 316 stores policies to be applied across the entire distributed enterprise computing environment and specifies what types of actions should be performed in response to, for example, detected events, conditions, results of evaluation during monitoring of application instances, or in response to administrator input, to facilitate the session control. Enterprise policies may be manifested in a variety of ways, such as an eXtensible Access Control Markup Language (XACML) based authorization engine, or the like. A rules engine (not shown) may be implemented by the session control manager 320 or ESS 310 to evaluate the policies set forth in the enterprise policies storage 316 based on detected events, conditions, evaluation of monitoring of an application instance, administrator input, or the like. The enterprise user registry 318 stores information regarding user accounts, credentials, security information, permissions, privileges, and the like, used within the distributed enterprise computing environment.

The ESS 310, via the SCM 320, performs two primary functions with regard to the application instances 332 on the application servers 330-360: session control and session monitoring. Session control refers to the ESS 310 ability to allow or terminate application sessions across the various application servers 330-360, or to otherwise control a user's access to applications via application sessions. Other examples of control operations that may be performed using the mechanisms of the illustrative embodiments include, but are not limited to redirecting a user to an alternative site/page instead of servicing a request, blocking certain client IP addresses or individual users, sending a customized response to the user submitting a request, facilitating n-factor authentication, and the like.

Session monitoring refers to the ability of the ESS 310 to collect and evaluate information regarding the configuration and use of application sessions associated with application instances 332 on the application servers 330-360. Examples of monitoring operations that may be performed by the ESS 310 include capturing input/output on an application for later analysis, analyzing captured input/output, evaluating request for safety (for example, detecting cross-site scripting (CSS) attacks or denial of service attacks), generating alerts when certain application actions are performed, and the like. Many different types of monitoring operations in addition to those described herein, as will be apparent to those of ordinary skill in the art in view of the present description, may be implemented using the mechanisms of the illustrative embodiments without departing from the spirit and scope of the present invention.

These two functions of control and monitoring allow the ESS 310 to provide a centralized control and monitoring of application sessions across all of the application servers in a distributed enterprise computing system.

The ESS 310 works in concert with the session control clients 370 on the application servers 330 by sending unicast and/or multicast requests to the session control clients 370. The ESS 310 uses the application registry 312, which contains appropriate metadata allowing the ESS 310 to forward requests to, and process responses, from session control clients 370 and their associated applications, and/or other components managed through the ESS 310 service. Such metadata includes information identifying the applications and other components, such as network address information, capabilities data, and the like. For example, the application identifier may identify a particular instance of an application 332 on a particular application server 330 uniquely and the capabilities data may specify the types of session control operations that may be performed on the application instance, e.g., a "control" capability that allows the ESS 310 to control the application sessions of the application instance 332 such that they may be allowed/terminated if needed, a "monitor" capability that allows the ESS 310 to monitor applications sessions of the application instance 332 such that session information indicative of how the application session is being used or is configured may be gathered, or the like.

More specific capability data may be provided as well other than the general "control" and "monitor" capability, but rather specific control and monitor capabilities may be specified, e.g., the ability to capture certain information from application sessions, redirect requests on application sessions to another location, etc. It should be appreciated that having application control/monitoring capabilities data specified in the application registry 312 is not required for the illustrative embodiments to function but is provided to make administration of the system more manageable. In some illustrative embodiments, the ESS 310 may simply send requests to the session control clients 370 without knowing if those particular requests are supported. The session control client 370 would then simply respond with an error for any request not supported. Having the capabilities data stored in the application registry 312 allows the ESS 310 to know a priori if a request is supported by a session control client 370 and thus, eliminates the need to send requests to session control clients 370 that do not support them.

The session control clients 370 on the application servers 330-360 comprise a session control agent 372 and a session monitoring agent 374, and may have an associated local policy storage 337. The session control agent 372 is responsible for performing operations to control the application sessions associated with applications 332 on the application server 330-360 on which it is executing. As mentioned above, such control may be to allow or terminate application sessions, redirect requests, sent over the application sessions, from users (via their client devices) to other websites/webpages rather than servicing the request, sending customized response messages in response to requests received over the application session, blocking particular client computing device IP addresses or user identifiers from utilizing the application sessions, or the like. The session monitoring agent 374 is responsible for performing operations to collect information regarding the various application sessions associated with applications 332 on the application server 330-360 on which it is executing. The session control agent 372 and session monitoring agent 374 operate in response to unicast and/or multicast requests sent from the SCM 320 of the ESS 310. These control and monitoring operations may be generalized to all application sessions or may be targeted to one or more specific user accounts, user identifiers, or the like.

Moreover, the session control agent 372 and/or session monitoring agent 374 may operate to evaluate information gathered from application sessions against policies or rules stored in the local policy storage 337. The local policies are applied only locally within the application server 330 to application sessions associated with application instances 332 executing on the application server 330 as opposed to the enterprise wide enterprise policies 316 utilized by the session control manager 320 of the ESS 310 in the centralized server 305. The results of some of these localized evaluations may be to elevate the control/monitoring from the local level within the application server 330 to the enterprise level at the session control manager 320, for example. Thus, for example, if a condition is detected at the local level, based on an evaluation of a policy in the local policy storage 337, that indicates that other control/monitoring operations should be performed on other application severs 330 within the enterprise, the detection of this condition may cause the session control client 370 to return a response to the ESS 310 indicating that particular enterprise policies 316 should be utilized to control/monitor application sessions on other application servers 330. The session control manager 320 may also collect information from a plurality of session control clients 370 on a plurality of application servers 330, and aggregate the information received to determine what, if any, enterprise policies 316 should be triggered to perform control/monitoring operations across the enterprise. Thus, multiple levels of policy evaluations may be utilized, e.g., local and enterprise-wide, with the mechanisms of the illustrative embodiments.

The requests that are sent to the session control clients 370 from the SCM 320 may target specific applications 332 on an application server 330-360 or may be directed to a plurality of applications 332 in general on different application servers 330-360. If a request targets specific applications 332 on an application servers 330-360, then a unicast request may be used. If a request targets a plurality of applications 332 on different application servers 330-360, then a multicast request may be used.

The SCCs 370 on the application servers 330-360 receive incoming control requests from the SCM 320 of the ESS 310 to perform either control operations or monitoring operations. The SCC 370 acts upon those requests for the applications 332 within its span of control, e.g., the local application server 330 or cluster. If the request targets a specific application or set of applications 332, then the SCC 370 may act on the request with regard to the identified application(s) 332 in the control request. Alternatively, rather than taking direct action with regard to the application(s) 332, the SCC 370 may instead trigger the processing of control operations and/or monitoring operations by agent(s) 334 associated with the application(s) 332. These agent(s) 334 may be implemented, for example, as plugin components to the application(s) 332, the operating system of the application server 330, or otherwise implemented in such a way as to facilitate an interaction with the application(s) 332 for purposes of control and/or monitoring.

In the case of a control request being unicast or multicast by the SCM 320 to the SCC 370, the session control agent 372 handles the performance of the control operation with regard to application sessions of the specified application(s) 332 or performs the triggering of such control operations by appropriate agent(s) 334 associated with the application(s) 332. In the case of a monitoring request being unicast or multicast by the SCM 320 to the SCC 370, the session monitoring agent 374 handles the performance of the monitoring operation with regard to application sessions of the specified application(s) 332 or performs the triggering of such monitoring operations by appropriate agent(s) 334 associated with the application(s) 332.

In addition to performing the control and monitoring operations within the application server 330-360, the session control client 370 may return results of these control and monitoring operations to the SCM 320 via the response collection component 322. The response collection component 322 mediates responses, e.g., collects, analyzes, and may modify the responses, from the managed application servers 330-360 and their applications 332. The responses include results of the SCC 370 performance of control/monitoring operations on the application sessions of the application(s) 332. These responses may be simply an acknowledgement that the requested control/monitoring operation has been completed, an error message indicating the requested control/monitoring operation was not able to be completed and the reason why, or may be more complex and provide information regarding the specific operation performed and/or the data collected as part of the operation. For example, with regard to a control operation, the responses may specify information about whether an application session was already in place when the control operation was performed, the last logon information for the application(s) 332 on the application server 330-360 for the particular user account specified in the control request, information about the last actions performed by the user via the application session prior to the control operation being performed, or the like. With regard to a monitoring operation, the responses may include the data collected as part of the monitoring operation.

The received responses from the SCCs 370 of the application servers 330 may be used to generate an output that may be presented to a system administrator 302, automated administrative system, or the like. For example, the received responses may be used to generate a textual and/or graphical display of the monitored activities on one or more application sessions, may be used to transmit a notification to a system administrator of the completion of a termination operation for terminating a user account on all application servers, may be used to transmit a notification to a system administrator indicating which application servers were unable to terminate application sessions and the reasons why, etc.

Figure 4A:
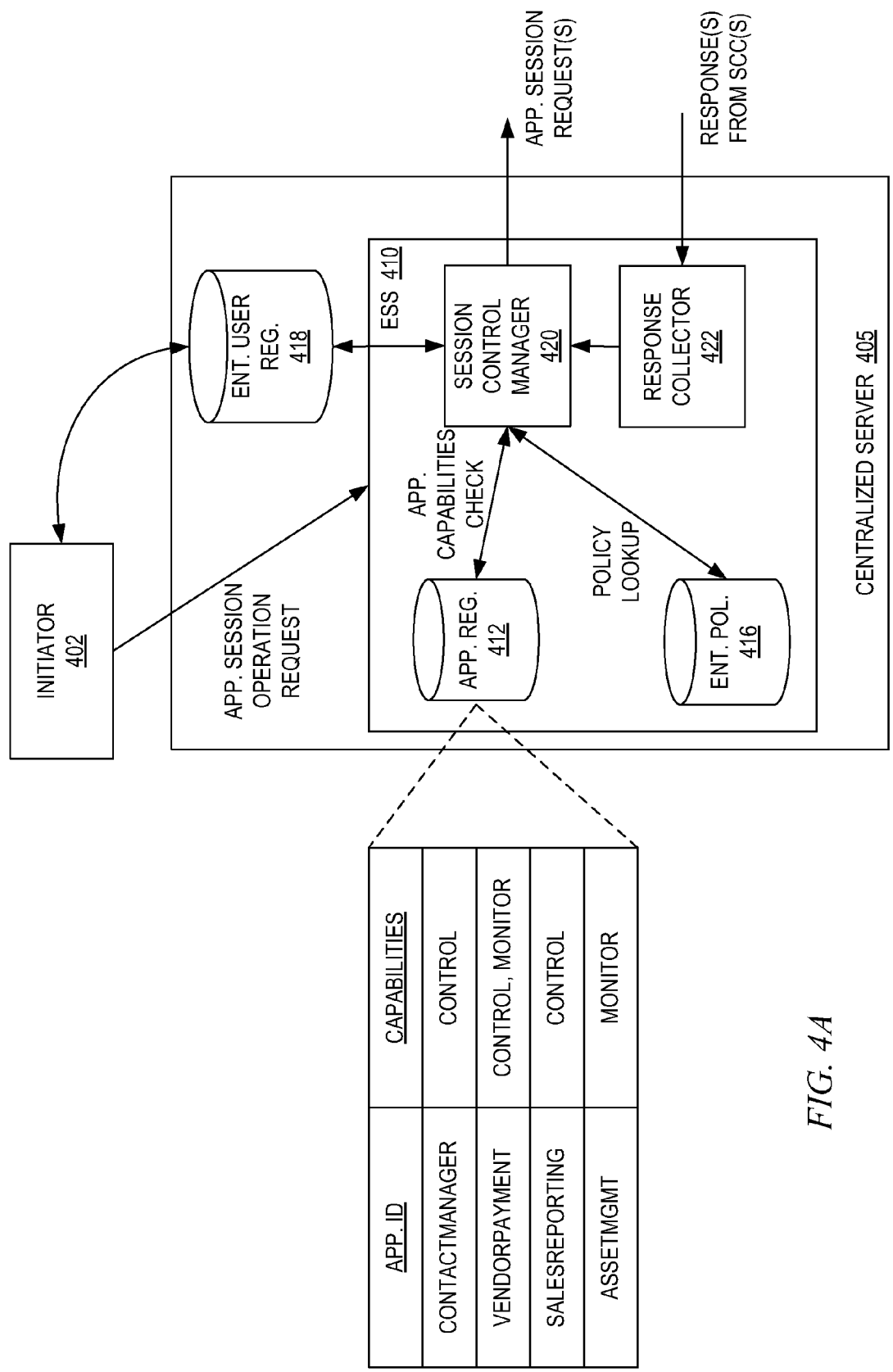
Figure 4B:
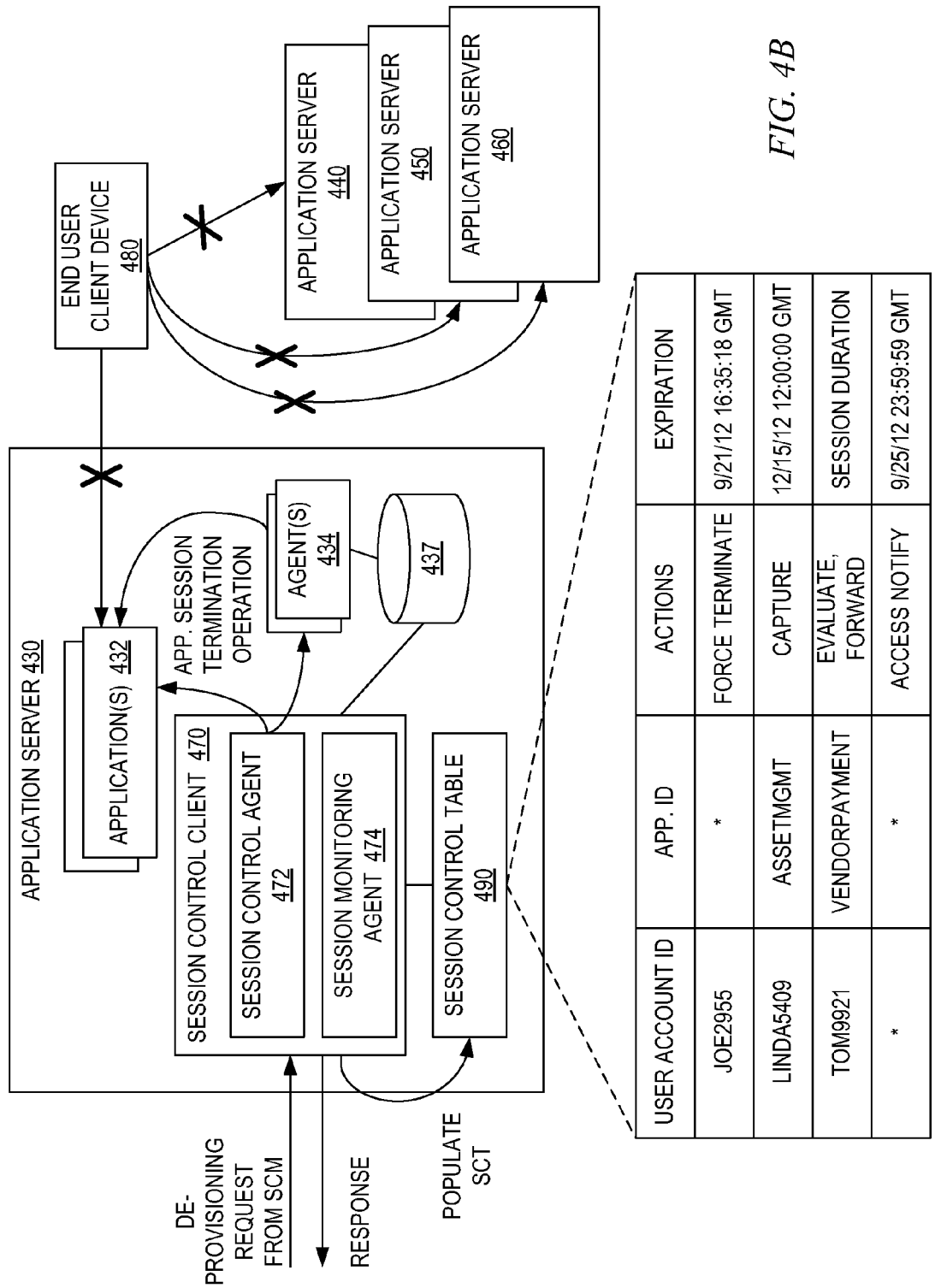

To further illustrate the operation of the illustrative embodiments with regard to application session control operations, reference is now made to FIGS. 4A and 4B which illustrates an operation of a centralized enterprise session control system architecture with regard performing a control operation on application servers in accordance with one illustrative embodiment. The control operation illustrated in this Figure is for de-provisioning of a user account on all application servers of a distributed enterprise computing system. Such a control operation may be performed, for example, in response to the termination of an employee's employment with the enterprise. In current systems, because of the distributed nature of the computing systems of large enterprises, it is difficult to terminate applications sessions for employees that have been terminated due to there not being any centralized application session control mechanism. As shown in FIGS. 4A and 4B, and described hereafter, the present invention provides mechanisms for providing such a centralized application session control.

With reference to FIG. 4A, in this de-provisioning control operation scenario, a system administrator 402 may, through his/her workstation or console, interact with the enterprise session services (ESS) 410 to instruct the ESS 410 to perform an application session operation, which in this example is a de-provisioning control operation, on application sessions associated with a specific user account identifier, which may be selected by the system administrator 402 from a listing of user accounts retrieved from the enterprise user register 418 or otherwise input to by the system administrator 402. Alternatively, the request may be automatically generated in response to the system administrator 402, or other authorized personnel, deleting or otherwise eliminating, inactivating, or suspending a user account in the enterprise user register 418. Such an automatic operation may be initiated due to an established enterprise policy in the enterprise policies storage 416, for example. That is, as one example, a policy may be established that when a user's account is inactivated in the enterprise user register 418 through a system management operation, a control operation is to be performed to de-provision application sessions associated with that user account. Another enterprise policy may be to automatically initiated application session monitoring for application sessions associated with the user account.

The request from the system administrator 402 may specify a particular application or set of applications on one or more application servers 430-460 of the enterprise computing system with which the control operation is to be performed. Alternatively, if no particular application or set of applications is specified in the request, then it may be determined that the request is intended to be applicable to all applications on all application servers 430-460 of the enterprise computing system.

The session control manager (SCM) 420 of the ESS 410 receives the de-provisioning request from a system administrator, de-provisioning services of an automated tool, or other initiator 402 and retrieves application registry 412 information indicating the application identifiers and corresponding control/monitoring capabilities for application instances on the various application servers 430-460 of the enterprise computing system. For those application instances identified in the request, or for all application instances across the enterprise computing system, the SCM 420 determines if the ESS 410 is capable of performing the requested control operation on the application instance. If so, then a request is generated and transmitted to the session control client (SCC) 470 of the application server 430 hosting the application instance via a unicast or multicast transmission. If the control operation is not permitted for the application instance, e.g., the application instance only has a monitor capability associated with it, then a corresponding request is not generated and transmitted to the application server.

With reference now to FIG. 4B, at the application server 430 the SCC 470 invokes the session control agent (SCA) 472 to implement the operations for performing the de-provisioning operation. The session control client 470 may make use of a session control table data structure 490 that stores, for each user identifier and application indication (if any) included in a request from the ESS 410, the corresponding actions to be taken by the session control agent 472 and session monitoring agent (SMA) 474, along with a corresponding expiration time for the action (if any). For example, in the depicted example, user joe2955 has the action "force terminate" with regard to any application sessions with any applications (since no specific application is identified in the session control table data structure 490 entry) until Sep. 21, 2012. The expiration time is optional and may be used to limit the time that the action is enforced due to various reasons, such as the fact that application sessions will eventually time out and thus, the application server 430 does not need to indefinitely maintain session management information in its memory or cache (since the user will typically be deleted from the user registry at this point). The expiration time may be set by a system administrator or automated tool and may be communicated in the de-provisioning request from the system administrator or automated tool. The SCC 470 populates the session control table 490 in response to receiving requests from the SCM 420 and instructs the SCA 472 and SMA 474 to perform the necessary control and monitoring operations specified in the session control table data structure 490.

In the example session control table 490 entries shown in FIG. 4B, some types of actions that may be performed by the SCA 472 and/or SMA 474 include force terminate (end an application session), capture (collect application session data regarding input/output of the application session), evaluate and forward (analyze the inputs/outputs of the application session, generate an evaluation of what is being done during the application session, and forward a notification of the results of this evaluation to a system administrator), and access notify (send a notification to a system administrator of a user's access to an application instance via an application session). These are only example actions and other control/monitoring actions may be used in addition to, or in replacement of, one or more of the actions shown in FIG. 4B.

The SCA 472, in response to the SCC 470 receiving the de-provisioning request from the SCM 420 of the ESS 410, and the population of the session control table 490 by the SCC 470, performs a termination operation to terminate any existing application sessions associated with the specified user account and application (if one is specified). Moreover, any future application sessions associated with this user account and application (if one is specified) are denied. As a result, the end user 480 cannot gain access to the application(s) 432 on the application servers 430-460. That is, for example, the SCA 472 of the SCC 470 may locally determine that an end user's attempt to access an application via its authentication mechanisms is to be blocked and, as a result, the SCA 472 may send control actions to the application 432 to deny access to the end user 480.

Optionally, the SCC 470 may send a response back to the SCM 420 of the ESS 410 to indicate the results of performing the requested control operation on the application sessions associated with the specified user account and application (if any is specified in the original request). The results information may be returned to the initiator 402 for further processing, output to a system administrator, or the like.

Thus, with the illustrative embodiments, provide mechanisms for performing centralized control of application sessions across a plurality of application instances on a plurality of application servers of a distributed enterprise computing system. Therefore, with the illustrative embodiments, de-provisioning of a user account may be performed across the entire distributed enterprise computing system automatically. This is a distinct improvement over known mechanisms where no such centralized control of application sessions is possible and instead, application sessions associated with a user account that has otherwise been inactivated may still be operational until they are individually terminated by a system administrator or the like specifically accessing the particular application servers and manually terminating the application sessions.

As mentioned above, another capability of the ESS 410 which may be driven through the SCM 420 is application session monitoring and management, hereafter referred to simply as "monitoring." This application session monitoring may take a variety of different forms including audit record logging or capture of request/response data streams, for example. Monitoring operations may be triggered as a session control operation in a similar manner as described above with regard to control operations. For example, such monitoring operations may be initiated manually by a system administrator, automatically by an automated tool, in response to other operations as specified by enterprise policies, or the like.

For example, with reference to FIG. 4C, when an application session monitoring request is received by the SCC 470 from the SCM 420, the SCC 470 may populate or update a corresponding entry in the session control table data structure 490 with the particular type of monitoring actions to perform on application sessions associated with the specified user account and application instances (if any are specified). The SCC 470 may trigger a session monitoring agent (SMA) 474 of the SCC 470 on the application server 430-460, to perform the require actions for the application sessions of the application/user account being monitored. The SMA 474 may access the applications' input/output data streams to perform such monitoring actions. For example, in a J2EE/JEE application server, this may be achieved via the use of intercepting filters 436, 438 controlled by the SMA 474. The intercepting filters 436, 438 provide direct integration with the application 432 itself and communicates with a rules engine 475 of the SMA 474 to pass data as appropriate for evaluation and receiving control inputs. In other implementations, similar functionality could be achieved through the use of plugin or proxy mechanisms as appropriate.

The SMA 474 uses the session control table data structure 490 to determine which application sessions associated with which user(s)/application(s) to monitor. As mentioned above, the SMA 474 includes a rules engine 475 that is configured with application specific rules, which may be stored, for example, in the local policies storage 437. Data provided by one or more of the intercepting filters 436, 438 is evaluated by the rules engine 475 of the SMA 474 based on these stored rules/policies in local policies storage 437 and monitoring actions are invoked as appropriate. These monitoring actions may comprise any of a plurality of different possible monitoring actions including, but not limited to, modifying the input/output data streams (for example, to perform "sanitizing" operations of the like), performing data capture operations, performing enhanced audit record logging, forwarding input/output data to another party or system (for example, to the ESS 410), forcing a redirect of the user to an alternative location than the application, e.g., to another URL or the like, generating an alert or notification to a system administrator or automated system, or terminating the user's application session.

Moreover, the local rules evaluation performed by the rules engine 475 may not only trigger local monitoring actions, but also my trigger enterprise level actions by elevating the monitoring to the enterprise level at the session control manager 320 using the enterprise policies 316. For example, the local rules engine 475 may determine that the monitoring of the input/output stream of an application session at the application server 330 indicates that something is out of profile and may escalate the monitoring to the enterprise level which then evaluates the application session information and determines whether broader actions are needed across other portions of the enterprise computing environment. For example, the session control manager 320, based on an evaluation of enterprise policies 316, may determine that monitoring of other applications and/or application servers is appropriate and may take steps to initiate such monitoring of other applications and/or application servers in the enterprise computing environment. Thus, multiple levels of monitoring is made possible, one at the local level which can only assess the application sessions associated with applications executing on the local application server, and another at the enterprise level which can correlate monitoring of application sessions across multiple application instances on multiple application servers.

The monitoring operations performed by the SMA 474 at the instruction of the SCC 470 in response to a monitoring request from the centralized SCM 420 of the ESS 410 may be performed on a per-user basis, per-application basis, or any combination thereof. Because monitoring of application sessions may be done with full session context, i.e. including the server data regarding the application sessions which is typically not available in known mechanisms, there is additional flexibility and actual control over application sessions.

At the ESS 410, the enterprise policies 416 may specify actions to be performed in response to receiving application session data from the various SMAs 474 of the application servers 430-460. The application session data may be stored in a data warehouse 411 associated with the ESS 410. The ESS 410, based on the enterprise policies 416 and the received application session data may include, for example, may perform data mining operations, security event correlation operations, or the like, to gather information about application sessions across all of the application instances 432 of the application servers 430-460 of the distributed enterprise computing system. The enterprise policies 416 may specify various actions to be performed based on such data mining or security event correlation including, but not limited to, performing no action, sending a session termination request to particular application servers, or all application servers, sending/modifying application monitoring requests, sending alert notifications to users/account owners, outputting a report or other indication of information gathered as part of the monitoring of application sessions, capturing additional monitoring data from application sessions, and the like. For example, if a user is performing actions which are identified to be "out of profile" either based on interaction with a single application or a set of applications, monitoring may be an appropriate action to take to further assess the interaction of the user with applications before taking additional control actions, such as redirecting, temporarily blocking, or even de-provisioning the user's application sessions.

Thus, the illustrative embodiments further provide mechanisms for performing application session monitoring across a plurality of application servers and applications. These mechanisms include the centralized enterprise session services (ESS) and session monitoring agents (SMAs) of the session control clients (SCCs) on the individual application servers. Thus, centralized monitoring of application sessions across a distributed enterprise computing system is facilitated.

It should be appreciated that while FIGS. 4A-4C illustrate example contents of registries and table data structures, i.e. application registry 412 and session control table data structure 490, these are only examples and are not intended to state or imply any limitation with regard to the arrangement or content of these structures. To the contrary, any application registry data or session control data may be used, having any appropriate arrangement, without departing from the spirit and scope of the illustrative embodiments.

Figure 5:
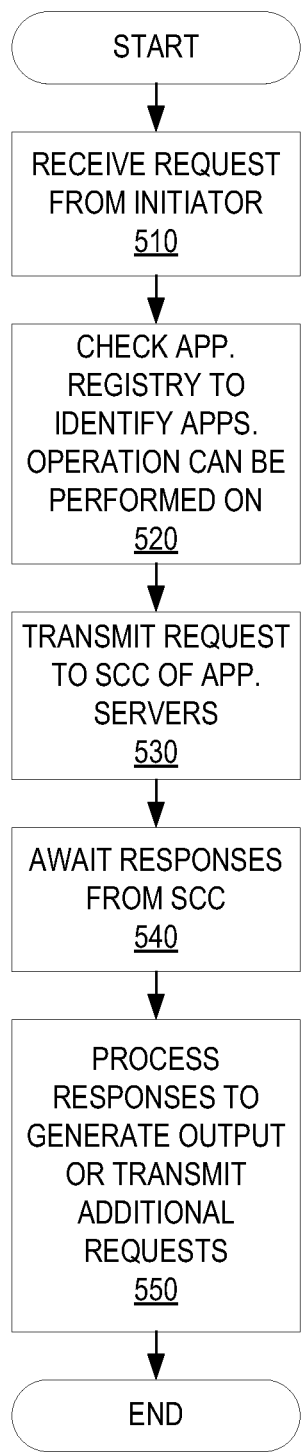
FIG. 5 is a flowchart outlining an example operation of an enterprise session services mechanism in accordance with one illustrative embodiment.

FIG. 5 is a flowchart outlining an example operation of an enterprise session services mechanism in accordance with one illustrative embodiment. As shown in FIG. 5, the operation starts with receiving a request from a system administrator, automated tool, or the like, requesting a control or monitoring operation to be performed on application sessions associated with a user account and optionally specified applications (step 510). The session control manager checks the application registry to determine if the requested operation can be performed on the identified applications, or if no specific application is identified, what applications in the enterprise computing system can have the requested operation performed on them (step 520). The session control manager then transmits requests, either as unicast or multicast requests, to the session control clients of the various application servers associated with the applications identified via the application register (step 530). The session control manager then awaits responses from the session control clients indicating results of performing the requested operation (step 540). The responses are processed to generate an output or to transmit additional operation requests to the session control clients to perform additional control/monitoring operations (step 550). The operation then terminates.

Figure 6:
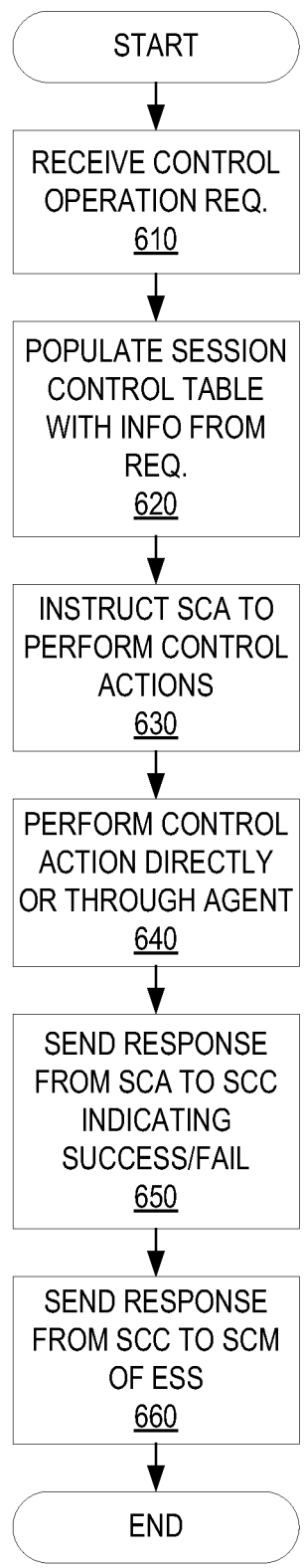
FIG. 6 is a flowchart outlining an example operation of a session control agent in accordance with one illustrative embodiment.

FIG. 6 is a flowchart outlining an example operation of a session control agent in accordance with one illustrative embodiment. As shown in FIG. 6, the operation starts by receiving a control operation request from the session control manager of the centralized ESS (step 610). The session control client populates a session control table data structure with the information from the control operation request specifying the user account, application identifier (if any), action to be performed, and expiration date/time (step 620). The session control client instructs a session control agent to perform control actions with regard to application instances hosted on the same application server, or application server cluster, with which the session control client is associated (step 630). The session control agent may access the applications directly or via an agent (e.g., plugin component) of the application instances to perform the control action associated with the user account and application instance specified in the session control table data structure having a control action (step 640). The session control agent may then respond to the session control client that the operation was completed either successfully or unsuccessfully depending on whether the action was able to be performed (step 650). The session control client may then send a response to the session control manager of the centralized ESS (step 660). The operation then terminates.

Figure 7:
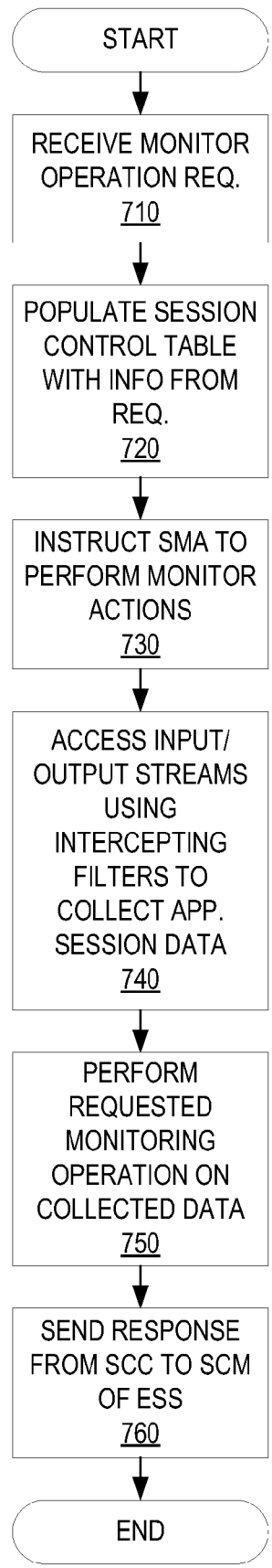
FIG. 7 is a flowchart outlining an example operation of a session monitoring agent in accordance with one illustrative embodiment.

FIG. 7 is a flowchart outlining an example operation of a session monitoring agent in accordance with one illustrative embodiment. As shown in FIG. 7, the operation starts by receiving a monitoring operation request from the session control manager of the centralized ESS (step 710). The session control client populates a session control table data structure with the information from the monitoring operation request specifying the user account, application identifier (if any), monitoring action to be performed, and expiration date/time (step 720). The session control client instructs a session monitoring agent to perform monitoring actions with regard to application instances hosted on the same application server, or application server cluster, with which the session control client is associated (step 730). The session control agent may access the application input/output streams via one or more intercepting filters to collect application session data (step 740). The requested monitoring operation, as specified in the session control table, is then performed based on the collected application session data (step 750). The session control client may then send a response to the session control manager of the centralized ESS based on the results of the performance of the monitoring operation (step 760). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing centralized monitoring of application sessions across a distributed computing environment comprising a plurality of application servers, comprising:

receiving, in the data processing system, a request to perform an application session monitoring operation to monitor at least one of input or output streams of application sessions associated with a specified user account identifier;

identifying, by the data processing system, a plurality of application instances across the plurality of application servers upon which to perform the requested application session monitoring operation;

transmitting, by the data processing system, an application session monitoring request to a plurality of session control clients associated with the plurality of application instances executing on a plurality of application servers of the distributed computing environment, wherein the application session monitoring request causes each session control client, in the plurality of session control clients, to monitor at least one of an input or an output stream of the application sessions of the application instances, associated with the session control client, that are associated with the specified user account identifier, and report results of the monitoring back to the data processing system;

receiving, by the data processing system, the results from the plurality of session control clients; and performing, by the data processing system, a termination operation to terminate executing application sessions of the application instances associated with the specified user account identifier.

2. The method of claim 1, wherein the application session monitoring operation is a data capture operation for capturing at least one of input data or output data of an application session of an associated application instance associated with the specified user account identifier.

3. The method of claim 1, wherein the application session monitoring operation is a safety evaluation operation for evaluating the safety of a request with regard to predefined types of attacks on the application instances.

4. The method of claim 1, wherein the application session monitoring operation is an alert operation for generating and transmitting an alert notification in response to a specified application action being performed based on a request transmitted over a corresponding application session the specified user account identifier.

5. The method of claim 1, wherein identifying the plurality of application instances upon which to perform the requested application session monitoring operation comprises performing a lookup operation in an application registry of the data processing system to identify entries corresponding to application instances upon which the requested application session monitoring operation is to be performed.

6. The method of claim 5, wherein entries in the application registry provide an address for a corresponding application instance and associated capabilities data specifying the types of control operations capable of being performed on application sessions associated with the corresponding application instance.

7. The method of claim 6, wherein the plurality of application instances are identified as application instances having entries in the application registry with capabilities data specifying a type of application session monitoring operation that may be performed that matches the requested application session monitoring operation.

8. The method of claim 1, wherein each session control client of the session control clients of the application servers controls agents associated with application instances on the application server associated with the session control client to perform the requested application session monitoring operation.

9. The method of claim 8, wherein the agents are plugin modules to the application instances on the application server associated with the session control client.

10. The method of claim 1, further comprising:

generating, by the data processing system, an output to a system administrator computing device based on the results received from the session control clients.

11. The method of claim 1, wherein the data processing system is a centralized enterprise session services computing device that performs centralized monitoring of application sessions across the plurality of application servers in the distributed computing environment.

12. The method of claim 1, wherein each session control client of the plurality of session control clients monitor at least one of an input or an output stream of application sessions of application instances, associated with the session control client, that are associated with the specified user account identifier, based on local policies associated with the session control client, and wherein if a condition of a local policy indicates a need to escalate the monitoring of the application sessions to an enterprise level, the session control client sends a notification to the data processing system to initiate enterprise level monitoring of application sessions of a plurality of application instances on a plurality of application servers.

13. A computer program product comprising a computer readable storage medium having a computer readable program stored therein, wherein the computer readable program, when executed on a computing device, causes the computing device to:

receive a request to perform an application session monitoring operation to monitor at least one of input or output streams of application sessions associated with a specified user account identifier;

identify a plurality of application instances across the plurality of application servers upon which to perform the requested application session monitoring operation;

transmit an application session monitoring request to a plurality of session control clients associated with the plurality of application instances executing on a plurality of application servers of the distributed computing environment, wherein the application session monitoring request causes each session control client, in the plurality of session control clients, to monitor at least one of an input or an output stream of the application sessions of the application instances, associated with the session control client, that are associated with the specified user account identifier, and report results of the monitoring back to the data processing system receive the results from the plurality of session control clients; and perform a termination operation to terminate executing application sessions of the application instances associated with the specified user account identifier.

14. The computer program product of claim 13, wherein the application session monitoring operation is a data capture operation for capturing at least one of input data or output data of an application session of an associated application instance associated with the specified user account identifier.

15. The computer program product of claim 13, wherein the application session monitoring operation is a safety evaluation operation for evaluating the safety of a request with regard to predefined types of attacks on the application instances.

16. The computer program product of claim 13, wherein the application session monitoring operation is an alert operation for generating and transmitting an alert notification in response to a specified application action being performed based on a request transmitted over a corresponding application session the specified user account identifier.

17. The computer program product of claim 13, wherein identifying the plurality of application instances upon which to perform the requested application session monitoring operation comprises performing a lookup operation in an application registry of the data processing system to identify entries corresponding to application instances upon which the requested application session monitoring operation is to be performed.

18. The computer program product of claim 17, wherein entries in the application registry provide an address for a corresponding application instance and associated capabilities data specifying the types of control operations capable of being performed on application sessions associated with the corresponding application instance.

19. The computer program product of claim 18, wherein the plurality of application instances are identified as application instances having entries in the application registry with capabilities data specifying a type of application session monitoring operation that may be performed that matches the requested application session monitoring operation.

20. The computer program product of claim 13, wherein each session control client of the session control clients of the application servers controls agents associated with application instances on the application server associated with the session control client to perform the requested application session monitoring operation.

21. The computer program product of claim 20, wherein the agents are plugin modules to the application instances on the application server associated with the session control client.

22. The computer program product of claim 13, wherein the computer readable program further causes the computing device to:

generate an output to a system administrator computing device based on the results received from the session control clients.

23. The computer program product of claim 13, wherein the data processing system is a centralized enterprise session services computing device that performs centralized monitoring of application sessions across the plurality of application servers in the distributed computing environment.

24. The computer program product of claim 13, wherein each session control client of the plurality of session control clients monitor at least one of an input or an output stream of application sessions of application instances, associated with the session control client, that are associated with the specified user account identifier, based on local policies associated with the session control client, and wherein if a condition of a local policy indicates a need to escalate the monitoring of the application sessions to an enterprise level, the session control client sends a notification to the data processing system to initiate enterprise level monitoring of application sessions of a plurality of application instances on a plurality of application servers.

25. An apparatus, comprising:
a processor; and
a memory coupled to the processor, wherein the memory comprises instructions which, when executed by the processor, cause the processor to:

receive a request to perform an application session monitoring operation to monitor at least one of input or output streams of application sessions associated with a specified user account identifier;

identify a plurality of application instances across the plurality of application servers upon which to perform the requested application session monitoring operation;

transmit an application session monitoring request to a plurality of session control clients associated with the plurality of application instances executing on a plurality of application servers of the distributed computing environment, wherein the application session monitoring request causes each session control client, in the plurality of session control clients, to monitor at least one of an input or an output stream of the application sessions of the application instances, associated with the session control client, that are associated with the specified user account identifier, and report results of the monitoring back to the data processing system receive the results from the plurality of session control clients;

perform a termination operation to terminate executing application sessions of the application instances associated with the specified user account identifier.

26. The method of claim 1, further comprising:
denying, by the data processing system, future application sessions associated with the specified user account identifier.

27. The method of claim 1, wherein performing the termination operation to terminate executing application sessions of the application instances associated with the specified user account identifier is in response to a termination of an employee associated with the specified user account identifier.

* * * * *